US006651017B2

(12) United States Patent
Heslop et al.

(10) Patent No.: US 6,651,017 B2
(45) Date of Patent: Nov. 18, 2003

(54) METHODS AND SYSTEMS FOR GENERATING A QUALITY ENHANCEMENT PROJECT REPORT

(75) Inventors: Steven Jeffrey Heslop, Mason, OH (US); James Andrew Lanzarotta, West Chester, OH (US); Michael Steven Olle, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 09/845,728

(22) Filed: Apr. 30, 2001

(65) Prior Publication Data

US 2003/0014204 A1 Jan. 16, 2003

(51) Int. Cl.[7] .......................... G01N 37/00; G06F 19/00
(52) U.S. Cl. ........................ 702/84; 600/510; 117/86; 493/213
(58) Field of Search .................. 702/84; 600/510; 117/86; 493/213

(56) References Cited

U.S. PATENT DOCUMENTS

| 5,308,788 | A | * | 5/1994 | Fitch et al. ............ 117/86 |
| 5,423,033 | A | | 6/1995 | Yuen |
| 5,425,373 | A | * | 6/1995 | Causey, III ............ 600/510 |
| 5,465,378 | A | | 11/1995 | Duensing et al. |
| 5,832,504 | A | | 11/1998 | Tripathi et al. |
| 6,035,286 | A | | 3/2000 | Fried |
| 6,055,541 | A | | 4/2000 | Solecki et al. |
| 6,090,029 | A | * | 7/2000 | LaFleur ............ 493/213 |
| 6,226,657 | B1 | | 5/2001 | Anderson |
| 6,233,583 | B1 | | 5/2001 | Hoth |

* cited by examiner

Primary Examiner—John Barlow
Assistant Examiner—Aditya Bhat
(74) Attorney, Agent, or Firm—Perkins Coie LLP

(57) ABSTRACT

Methods and systems for generating a quality enhancement project report. In one embodiment, the methods and systems generate a report of a Six Sigma quality enhancement project directed to a selected process. The project report in this embodiment includes a starting process capability, an ending process capability, a confidence level for the process capabilities, a performance chart that graphically depicts a process improvement and economic data corresponding to the overall cost savings that should result from implementing the process improvement. In one embodiment, a user automatically generates a project report by entering basic project information into various fields on a computer-implemented form displayed on a computer screen. This basic information can include starting process performance data, ending process performance data, and economic data such as labor reductions and implementation costs. After the user has entered this information, process parameters that characterize the project results are automatically generated on the computer-implemented form.

69 Claims, 9 Drawing Sheets

Fig. 4

Steps: 1) Enter Upper / Lower Spec Limits
2) Enter Starting/Ending data for cycle time, dimensional tolerances....
       (A maximum of 50 data points can be entered for each column.)
3) Enter "Ctrl g" on keyboard (process graph & evaluation will be generated)
       (If current graph exists, select graph and hit delete key)

602

| Data Entry | | |
|---|---|---|
| 4.6 | Upper Spec limit | |
| 2.2 | Lower Spec limit ← | No lower spec limit needed for cycle time data |

604

606

| | | | Graph Data | | | | | | |
|---|---|---|---|---|---|---|---|---|---|
| No. | Starting | Ending | Starting | Ending | UCL | LCL | Mean | USL | LSL | MR |
| 1 | 4.2000 | 2.9000 | 4.2000 | | | | 4.0455 | 4.6 | 2.2 | |
| 2 | 4.1000 | 2.9000 | 4.1000 | | | | 4.0455 | 4.6 | 2.2 | |
| 3 | 4.2000 | 2.8000 | 4.2000 | | | | 4.0455 | 4.6 | 2.2 | |
| 4 | 4.3000 | 3.1000 | 4.3000 | | | | 4.0455 | 4.6 | 2.2 | |
| 5 | 4.2000 | 3.2000 | 4.2000 | | | | 4.0455 | 4.6 | 2.2 | |
| 6 | 4.3000 | 2.9000 | 4.3000 | | | | 4.0455 | 4.6 | 2.2 | |
| 7 | 4.5000 | 3.4000 | 4.5000 | | | | 4.0455 | 4.6 | 2.2 | |
| 8 | 4.3000 | 3.3000 | 4.3000 | | | | 4.0455 | 4.6 | 2.2 | |
| 9 | 4.7000 | 3.2000 | 4.7000 | | | | 4.0455 | 4.6 | 2.2 | |
| 10 | 4.3000 | 3.1000 | 4.3000 | | | | 4.0455 | 4.6 | 2.2 | |
| 11 | 4.6000 | 2.9000 | 4.6000 | | | | 4.0455 | 4.6 | 2.2 | |
| 12 | 4.0000 | 2.8000 | 4.0000 | | | | 4.0455 | 4.6 | 2.2 | |
| 13 | 4.1000 | 2.7000 | 4.1000 | | | | 4.0455 | 4.6 | 2.2 | |
| 14 | 4.2000 | 2.9000 | 4.2000 | | | | 4.0455 | 4.6 | 2.2 | |
| 15 | 3.9000 | 3.1000 | 3.9000 | | | | 4.0455 | 4.6 | 2.2 | |
| 16 | 3.8000 | 3.4000 | 3.8000 | | | | 4.0455 | 4.6 | 2.2 | |
| 17 | 3.7000 | 3.2000 | 3.7000 | | | | 4.0455 | 4.6 | 2.2 | |
| 18 | 3.5000 | 3.2000 | 3.5000 | | | | 4.0455 | 4.6 | 2.2 | |
| 19 | 3.6000 | 3.1000 | 3.6000 | | | | 4.0455 | 4.6 | 2.2 | |
| 20 | 3.4000 | 3.4000 | 3.4000 | | | | 4.0455 | 4.6 | 2.2 | |
| 21 | 3.6000 | 3.2000 | 3.6000 | | | | 4.0455 | 4.6 | 2.2 | |
| 22 | 3.5000 | | 3.5000 | | | | 4.0455 | 4.6 | 2.2 | |
| 23 | | | | 2.9000 | 3.5464 | 2.6155 | 3.0810 | 4.6 | 2.2 | 0.0000 |
| 24 | | | | 2.9000 | 3.5464 | 2.6155 | 3.0810 | 4.6 | 2.2 | 0.1000 |
| 25 | | | | 2.8000 | 3.5464 | 2.6155 | 3.0810 | 4.6 | 2.2 | 0.3000 |
| 26 | | | | 3.1000 | 3.5464 | 2.6155 | 3.0810 | 4.6 | 2.2 | 0.1000 |
| 27 | | | | 3.2000 | 3.5464 | 2.6155 | 3.0810 | 4.6 | 2.2 | 0.3000 |
| 28 | | | | 2.9000 | 3.5464 | 2.6155 | 3.0810 | 4.6 | 2.2 | 0.5000 |
| 29 | | | | 3.4000 | 3.5464 | 2.6155 | 3.0810 | 4.6 | 2.2 | 0.1000 |
| 30 | | | | 3.3000 | 3.5464 | 2.6155 | 3.0810 | 4.6 | 2.2 | 0.1000 |
| 31 | | | | 3.2000 | 3.5464 | 2.6155 | 3.0810 | 4.6 | 2.2 | 0.1000 |
| 32 | | | | 3.1000 | 3.5464 | 2.6155 | 3.0810 | 4.6 | 2.2 | 0.2000 |
| 33 | | | | 2.9000 | 3.5464 | 2.6155 | 3.0810 | 4.6 | 2.2 | 0.1000 |
| 34 | | | | 2.8000 | 3.5464 | 2.6155 | 3.0810 | 4.6 | 2.2 | 0.1000 |
| 35 | | | | 2.7000 | 3.5464 | 2.6155 | 3.0810 | 4.6 | 2.2 | 0.2000 |
| 36 | | | | 2.9000 | 3.5464 | 2.6155 | 3.0810 | 4.6 | 2.2 | 0.2000 |
| 37 | | | | 3.1000 | 3.5464 | 2.6155 | 3.0810 | 4.6 | 2.2 | 0.3000 |
| 38 | | | | 3.4000 | 3.5464 | 2.6155 | 3.0810 | 4.6 | 2.2 | 0.2000 |
| 39 | | | | 3.2000 | 3.5464 | 2.6155 | 3.0810 | 4.6 | 2.2 | 0.0000 |
| 40 | | | | 3.2000 | 3.5464 | 2.6155 | 3.0810 | 4.6 | 2.2 | 0.1000 |
| 41 | | | | 3.1000 | 3.5464 | 2.6155 | 3.0810 | 4.6 | 2.2 | 0.3000 |
| 42 | | | | 3.4000 | 3.5464 | 2.6155 | 3.0810 | 4.6 | 2.2 | 0.2000 |
| 43 | | | | 3.2000 | 3.5464 | 2.6155 | 3.0810 | 4.6 | 2.2 | |
| 44 | | | | | | | | 4.6 | 2.2 | |
| 45 | | | | | | | | 4.6 | 2.2 | |
| 46 | | | | | | | | 4.6 | 2.2 | |
| 47 | | | | | | | | 4.6 | 2.2 | |
| 48 | | | | | | | | 4.6 | 2.2 | |
| 49 | | | | | | | | 4.6 | 2.2 | |
| 50 | | | | | | | | 4.6 | 2.2 | |

NPI Risk Assessment

| Category | Risk | Prob | Impact | | | Weighting | | | Total Score | Abatement Plan |
|---|---|---|---|---|---|---|---|---|---|---|
| | | | Sch | Cost | Tech | Sch | Cost | Tech | | |
| Measurements | GB uses MiniPitch for training | L | M | H | M | 2 | 3 | 2 | 7 | Training in Wilmington is complete / Non-issue |
| Materials | Software Access | L | L | H | L | 1 | 3 | 1 | 5 | Excel is standard load on all computers |
| Materials | WinCenter | L | M | M | L | 2 | 2 | 1 | 5 | File can be accessed using "File Manager" |
| People | Computer Skills | M | H | M | M | 6 | 4 | 4 | 14 | Single software package will enhance learning & efficiency / Training class |
| Machines | Different types of computers not able to access file for use | L | L | L | L | 1 | 1 | 1 | 3 | Compatibility checked and non-issue |
| | | | | | | | | | 0 | |
| | ****** SAMPLE DATA ****** | | | | | | | | 0 | |
| | IMPACT RATING NOT CORRECT | | | | | | | | 0 | |
| | | | | | | | | | 0 | |
| | | | | | | | | | 0 | |
| | | | | | | | | | 0 | |
| | | | Enter your rating into the highlighted cells | | | | | | | |

*Fig. 8*

METHODS AND SYSTEMS FOR GENERATING A QUALITY ENHANCEMENT PROJECT REPORT

TECHNICAL FIELD

The described technology relates generally to automated report generation, and more particularly, to methods and systems for automatically generating a quality enhancement project report.

BACKGROUND

In today's competitive business environment, companies are continually searching for ways to reduce costs. At one time, it was widely held that the cost of producing defect-free products outweighed the benefits. Today, however, it is generally accepted that producing defect-free products at the outset is less expensive than responding to an occasional defect later. Consistent with this philosophy, a number of different quality enhancement programs have come to the fore in recent years to help companies increase the quality of their products. Continuous Process Improvement, Design for Quality, and Six Sigma are but three examples.

Six Sigma is a quality enhancement process that focuses on designing and monitoring everyday business activities in ways that minimize waste and resources while increasing customer satisfaction. Six Sigma provides specific methods for analyzing and improving processes so that defects and errors never arise in the first place. The phrase, "Six Sigma," actually refers to a statistical measure of process capability that indicates how well the process is performing. For example, a process that is performing to a three sigma capability would experience 67,000 defects per million defect opportunities. In contrast, a process having a six sigma capability would experience only 3.4 defects per million defect opportunities. Thus, one goal of the Six Sigma quality enhancement process is to drive process capability to a six sigma level. Another goal of the Six Sigma process is to standardize the methods and processes that result in six sigma quality, then integrate these standard methods and processes into the design cycle so that future products will have them built-in.

There are eight fundamental stages, or phases, to achieve six sigma quality in a process, division or company. They are recognize, define, measure, analyze, improve, control, standardize and integrate. The five core phases are define, measure, analyze, improve and control. The define phase involves defining the processes that contribute to the functional problems. The measure phase involves measuring the capability of each process that offers operational leverage. The analyze phase involves analyzing the data to assess prevalent patterns and trends. The improve phase involves improving the key product/service characteristics created by the key processes. Finally, the control phase involves controlling the process variables that exert undue influence on process performance. A detailed description of the core phases of the Six Sigma process can be found in numerous references, such as Rath & Strong's *Six Sigma Pocket Guide*, second printing, January 2001.

Implementing some process improvements can be costly. Hence, companies will often want to evaluate the results of a Six Sigma project before implementing a process improvement to ensure the results merit the expenditure. This evaluation process often calls for project participants to devote a significant amount of time and energy to preparing a project report for presentation to their management. These reports are frequently prepared in a number of different formats using a number of different software applications, such as Microsoft Word, Microsoft Project, Microsoft Excel, Microsoft PowerPoint and Visio.

This approach to generating a Six Sigma project report has a number of drawbacks, not the least of which is the time and effort required on the part of the project participants to "cut and paste" project results and other data into a format that can be quickly and easily understood by their management. The amount of effort required by this approach can also lead to low project completion rates, and can discourage future participation in Six Sigma projects. Another drawback to this approach is that different projects will often use different report formats, making it difficult for management to perform consistent evaluations or compare the results from one project to the results of another. Therefore, a simplified process for generating a Six Sigma project report would be desirable.

BRIEF DESCRIPTION OF THE DRAWINGS

FIG. 4 is a diagram illustrating a display description for generating a quality enhancement project report in accordance with an embodiment.

FIG. 6 is a diagram illustrating a spreadsheet for compiling selected process data in accordance with an embodiment.

FIG. 8 is a diagram illustrating a display description for a risk assessment chart in accordance with an embodiment.

DETAILED DESCRIPTION

Figure 1:
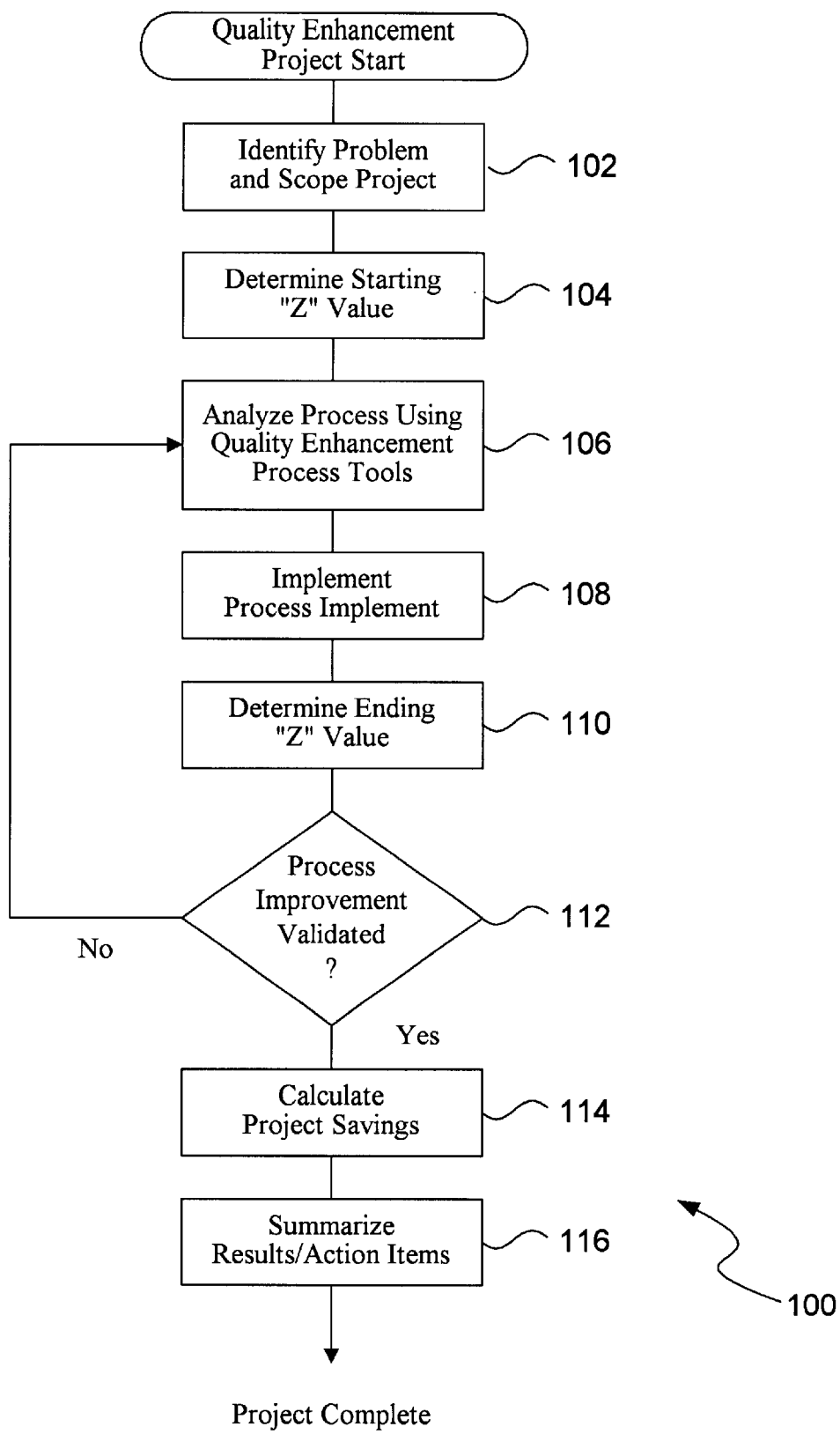
FIG. 1 is a flow diagram of a method for performing a quality enhancement project in accordance with an embodiment.

The following disclosure describes methods and systems for generating a quality enhancement project report. In one embodiment, the methods and systems generate a report of a Six Sigma quality enhancement project directed to reducing the number of defective units or defects produced by a given process. In this embodiment, the methods and systems generate a project report that includes starting process capability data corresponding to the unimproved process, ending process capability data corresponding to the improved process, and economic data corresponding to the overall cost savings that should result from implementing the process improvement.

In one embodiment, a user, such as a Six Sigma project participant, automatically generates a project report by entering basic project information into various fields on a computer-implemented form displayed on a computer screen. This basic information can include a project title and project participants, starting process performance data, ending process performance data, and economic data such as labor hour reductions and implementation costs. After the user has entered this information, process parameters that characterize the project results are automatically generated on the computer-implemented form. These parameters include starting and ending process capability values, confidence levels for the process capability values, performance charts that graphically depict process improvements, and total cost savings that can be expected through implementation of the process improvements.

In contrast to conventional methods, which may involve the use of a number of different software applications, the methods provided here enable a user with only a basic knowledge of the Six Sigma process to prepare a comprehensive project report using only one software application. The simplification offered by the methods disclosed encourages greater participation in Six Sigma projects and greater uniformity in project documentation, leading to a more balanced evaluation of Six Sigma projects and easier bookkeeping of project results.

Certain embodiments of the methods and systems disclosed will be described in the context of computer-executable instructions executed by a general-purpose computer, such as a personal computer. For example, in one embodiment, the computer-executable instructions that generate the computer-implemented form (the "form") are stored on a computer-readable medium, such as a floppy disk or CD-ROM. In another embodiment, these instructions are stored on a server computer system and accessed via an intranet computer network or the Internet. Because the structures and functions related to computer-executable routines and corresponding computer implementation systems are well known, they have not been shown or described in detail here, to avoid unnecessarily obscuring the described embodiments.

Although the following description provides specific details for a thorough understanding of several embodiments of the methods and systems provided, one of skill in the relevant art will understand that these embodiments can be practiced without some of these details. In other instances, one skilled in the art will appreciate that the methods and systems disclosed can include additional details, without departing from the scope of the described embodiments. Although embodiments are described in the context of the Six Sigma quality enhancement process, it will be understood that they are also suitable for generating reports on a number of different types of projects. Therefore, the methods and systems disclosed are not limited to the Six Sigma process, nor are they limited to the quality enhancement arts in general.

FIG. 1 is a flow diagram of a method 100 for performing a quality enhancement project in accordance with an embodiment. In block 102, a quality problem is identified and the project is scoped. An example of a quality problem in this embodiment would be a manufacturing process that is producing too many defective units or defects, and an example of a project scope would be that portion of the process where the defects are occurring.

In block 104, an initial process capability, or "starting Z value," is determined. As is known by those of skill in the art, the Z value is a measure of process performance. For example, consider a manufacturing process for producing a part feature that has an upper and lower specification limit. Assume that a distribution of data points representing a series of these features forms a bell-shaped curve indicative of a normal distribution. The mean value of these data points would be located approximately at the middle of the bell-shaped curve, and one standard deviation would represent an average distance between the distributed data points and the mean value. The Z value for this process, then, is defined as the number of standard deviations between the mean value and the closest specification limit.

Accordingly, a process having a relatively small standard deviation will have a relatively high number of standard deviations between the mean value and the closest specification limit. Such a process will also accordingly have a relatively high Z value, referred to as a high "process capability." Conversely, a process having a relatively large standard deviation will accordingly have a relatively low Z value, or a low process capability. Hence, the purpose of block 104 is to determine the starting Z value, or starting process capability, before any improvements have been made to the process.

In block 106, the process is analyzed using various diagnostic tools known to those of ordinary skill in the art, such as cause-and-effect diagrams, process maps, and risk assessment charts. Analysis of the process helps to identify and suggest process improvements for implementation in block 108. After the process improvements have been implemented in block 108, the ending Z value, or ending process capability, is determined in block 110. Comparing the ending Z value to the starting Z value provides a measure of how much the process has been improved. However, whether this comparison can be relied on depends on the level of confidence afforded the starting and ending Z values.

In decision block 112, a confidence level is calculated for the starting and ending Z values for the purpose of validating the process improvement. If the confidence level is unacceptable, then the method 100 returns to block 106 to reanalyze the process and develop further improvements. If the confidence level is high enough to validate the process improvement, then in block 114 the potential savings from the process improvement is calculated. In block 116, the quality enhancement project is concluded by summarizing the cost saving results and documenting further actions that need to be taken to maintain the improved process.

Figure 2:
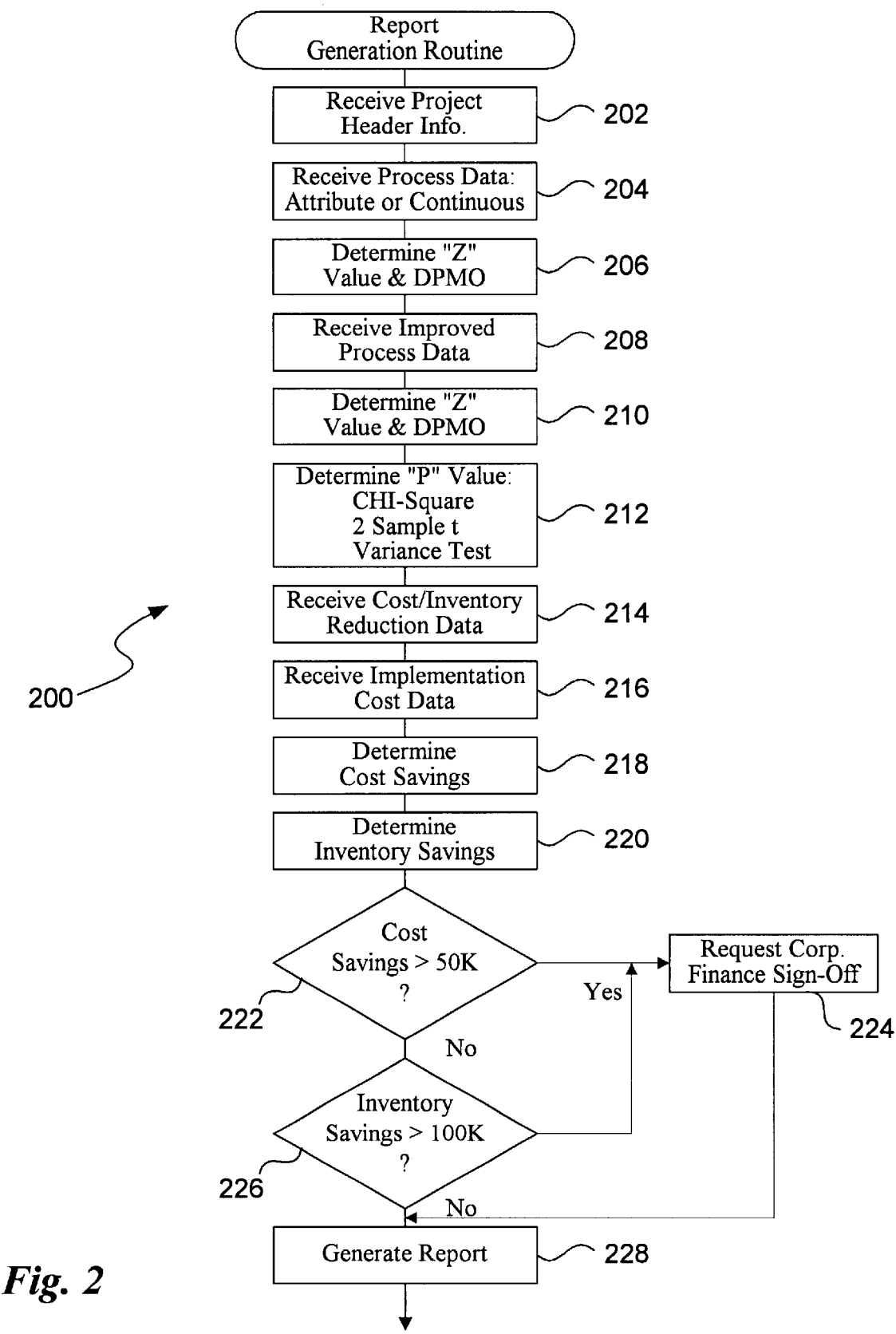
FIG. 2 is a flow diagram of a routine for generating a report of a quality enhancement project in accordance with an embodiment.

FIG. 2 is a flow diagram of a routine 200 for generating a report of a quality enhancement project in accordance with an embodiment. For the purpose of illustration, the quality enhancement project is a Six Sigma project. The purpose of the Six Sigma project could be, for example, to reduce the number of defects or defective units produced by a particular manufacturing process. In one embodiment, the report of the Six Sigma project is generated by a user-computer performing the routine 200 according to computer-executable instructions stored on a computer-readable medium, such as a CD-ROM or floppy disk. In another embodiment, the routine 200 can be performed using computer-executable instructions stored on a server computer system connected to the user computer via a computer network, such as an intranet computer network or the Internet.

In block 202, the routine 200 receives basic header information from the user about the quality enhancement project. This information can include a project title, a project leader, and project objectives. In block 204, the routine receives starting process performance data. "Starting process performance data" is process performance data collected before any improvements have been made to the process. As is known to those of skill in the art, this data can be classified as either attribute data or continuous data.

"Attribute data" refers to data that simply indicates whether a part is good or bad. "Continuous data" refers to part or feature data that falls within a specified range. For example, if individual parts ("units") in a series of units were determined to be either good or bad, then this data would qualify as attribute data. If instead a unit feature, for example a hole diameter, was measured and recorded for a series of units, then this data would qualify as continuous data. Accordingly, in block 204, the routine 200 receives either attribute or continuous data for the process before any improvements have been made.

In block 206, the routine determines a starting Z value and a starting DPMO based on the starting process performance data received in block 204. As explained above, the Z value is a measure of process performance, and is equal to the number of standard deviations (also known as Sigmas) between the mean value of the process and the closest specification limit. DPMO is an acronym that stands for "Defects Per Million Opportunities." The Z value and DPMO of a process characterize process capability. Thus, the routine 200 determines the initial process capability by determining the Z value and DPMO in block 206.

In block 208, the routine receives ending process performance data. "Ending process performance data" is process performance data collected after improvements have been made to the process. In one embodiment, these process improvements are developed using well known Six Sigma tools, such as process maps and cause-and-effect diagrams. The ending process data received in block 208 quantifies the same attribute or continuous process parameters that were quantified by the starting process performance data received in block 204. In block 210, the routine determines an ending Z value and ending DPMO based on the ending process performance data received in block 208. Presumably, a comparison of the starting Z value and starting DPMO to the ending Z value and ending DPMO will illustrate the effectiveness of the process improvements.

In block 212, the routine determines a P value based on the starting and ending process data entered in blocks 204 and 208. As is known to those of ordinary skill in the art, the P value is a measure of the confidence level corresponding to a given set of data. For example, a P value of 0.05 corresponds to a 95% confidence level in the corresponding data. If, for example, the routine 200 determined a starting Z value of 1.5 in block 206 and an ending Z value of 2.0 in block 210, then a corresponding P value of 0.05 in block 212 would reflect a 95% confidence that the process had in fact been improved from a Z of 1.5 to a Z of 2.0. The P value can be determined in block 212 using a number of known methods, such as the chi-square method, the 2-sample-t method and the variance test method.

In block 214, the routine receives cost and inventory reduction data. This data can include reductions in labor hours, reductions in scrappage, and reductions in inventory shelf-time resulting from the improved process. In block 216, the routine receives data reflecting the cost of implementing the process improvements. In block 218, the routine determines the total cost savings that should result from implementing the process improvements based on the data received in blocks 214 and 216. In block 220, the routine determines the total inventory reduction savings based on the data received in block 214.

In one embodiment, in decision block 222, if the total cost savings determined in block 218 exceed a cost savings endorsement limit (e.g., $50,000), then the routine will request an endorsement from a suitable party in block 224. This endorsement could, for example, comprise the name of a finance department member that has reviewed and acknowledged the claimed savings. Similarly, in decision block 226, if the inventory reduction savings determined in block 220 exceed an inventory reduction savings endorsement limit (e.g., $100,000), then the routine will again request a suitable endorsement in block 224.

In block 228, the routine generates a report of the quality enhancement project. This report can be used to decide whether or not to implement the process improvement developed by the Six Sigma project. In one embodiment, this report can include starting process capability data (starting Z value), improved or ending process capability data (ending Z value), and a corresponding confidence level (P value). This report can also include economic data, such as the expected overall cost savings and the expected inventory reduction savings.

Figure 3:
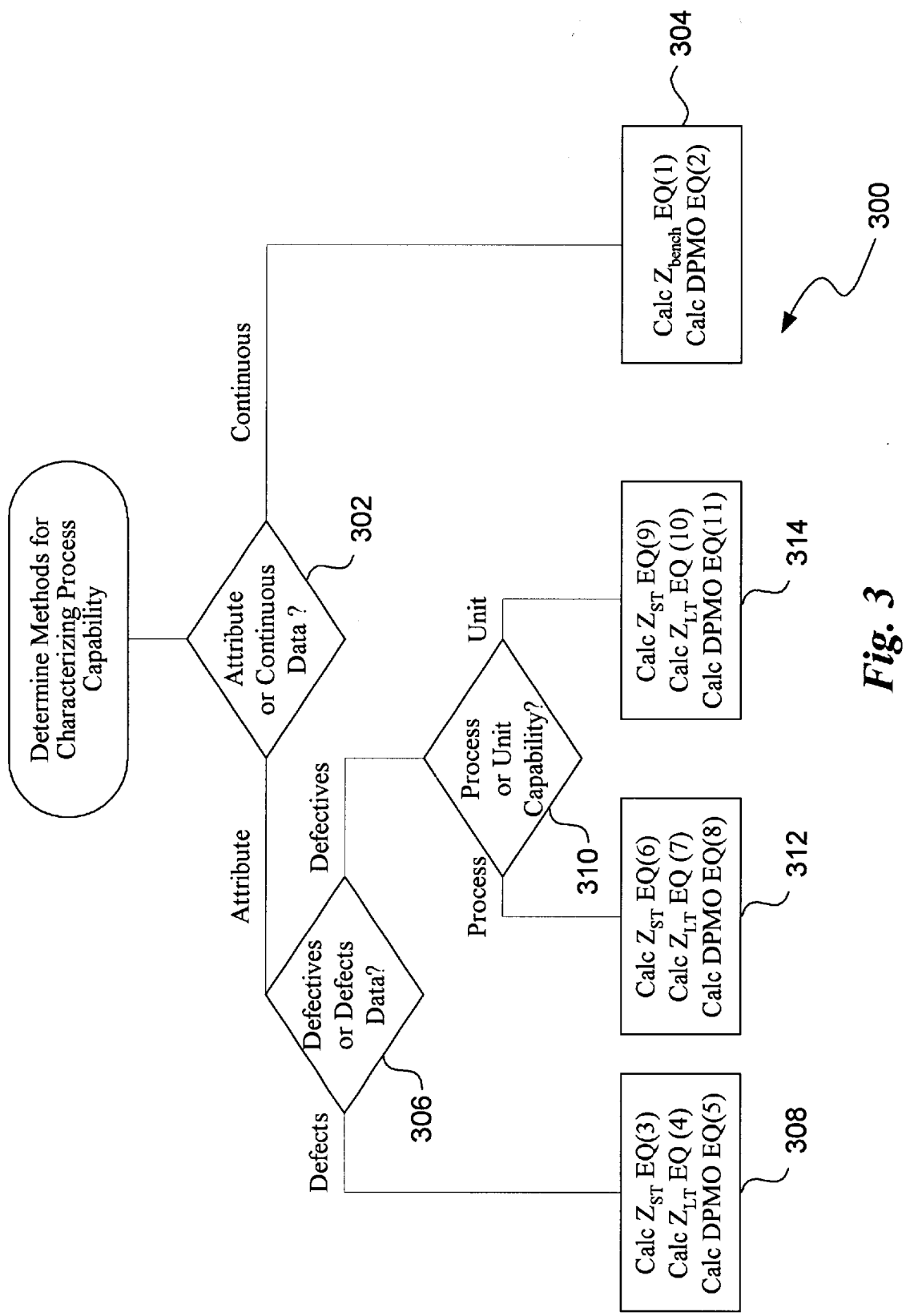
FIG. 3 is a flow diagram of a routine for determining methods for characterizing process capability in accordance with an embodiment.

FIG. 3 is a flow diagram of a routine 300 for determining methods for characterizing process capability in accordance with an embodiment. In one embodiment, the routine 300 is used to determine methods for calculating a Z bench value, a short-term Z value, a long-term Z value and a DPMO. For example, in a typical Six Sigma project the participants will study a particular process and develop improvements to the process in an effort to move the process toward Six Sigma capability. In this context, the routine 300 is used to determine the methods for characterizing the process's capability both before and after the process has been improved.

In decision block 302, the routine 300 begins by determining if the process data is attribute data or continuous data. If the process is described by continuous data having a lower specification limit (LSL) and an upper specification limit (USL), then in block 304 the routine determines that process capability should be characterized by calculating a Z bench value using equation (1) and by calculating a DPMO using equation (2).

EQN (1):

$$\text{Define: } NORMSINV = \text{A Microsoft Excel spreadsheet function that yields the inverse of the standard normal cumulative distribution of the given probability}$$

$$NORMSDIST = \text{A Microsoft Excel spreadsheet function that returns the standard normal cumulative distribution function}$$

$$Z_{LSL} = \frac{\text{Mean} - LSL}{\text{Std Dev}}$$

$$Z_{USL} = \frac{USL - \text{Mean}}{\text{Std Dev}}$$

$$\text{Then, } Z_{bench} = NORMSINV[1 - ((1 - NORMdist(Z_{LSL})) + (1 - NORMdist(Z_{LSL})))]$$

$$DPMO = (1 - NORMSDIST(Z_{bench})) \times 10^6 \qquad \text{EQN(2)}$$

If the process is described by attribute data, then in decision block 306 the routine 300 determines if the attribute data is "defectives" data or "defects" data. Defectives data is data that indicates whether a particular product, or unit, is defective because it has one or more defects. Defects data, on the other hand, is data that indicates whether a particular feature does or does not meet customer requirements, and hence, whether the feature is or is not a defect. For example, if units coming off an assembly line are inspected as being either good or bad, then this unit data would be defectives data, because it indicates whether or not the units are defective. However, each unit had 10 holes drilled in it, for example, and each hole was inspected against its requirements, then this hole data would be defects data, because it indicates whether or not each hole is a defect.

Accordingly, if the process involves defects data, then in block 308 the routine 300 determines that process capability should be characterized by calculating a Z short-term value using equation (3), by calculating a Z long-term value using equation (4), and by calculating a DPMO using equation (5).

| | |
|---|---|
| EQN (3) for "Z" short term: | Define: A = number of units ran without a defect<br>If A = 0, then "Z" short term = 0<br>If A $\leq$ 6 then "Z" short term = "Z" long term + 1.5<br>If A > 6, then "Z" short term = NORMSINV(1 − (1/(A + 2))) |
| EQN (4) for "Z" long term: | Define: C = total number of units ran<br>Define: F = number of defects in total number of units ran<br>If C = 0, then "Z" long term = 0<br>If F = 0, then "Z" long term = NORMSINV(1 − (1/(C + 2)))<br>If F does not = 0, then "Z" long term = NORMSINV(1 − (DPMO/10$^6$)) |
| EQN (5) for DPMO: | Define: EXP(number) = an Excel spreadsheet function for base e taken to the exponent number, e.g. EXP(2) = e2<br>If C = 0, then DPMO = 0<br>If F = 0, then DPMO (1/(C + 2)) × 10$^6$<br>If F does not = 0, then DPMO = (1 − EXP(−1 × (F/C))) × 10$^6$ |

If the process involves defectives data, then in decision block 310 the routine 300 determines if the defectives data is "process" related or "unit" related. An example of process related defectives data would be units having ten holes drilled in them wherein each unit is determined to be either good or bad based on an inspection of each hole to determine if each hole meets its requirements. An example of unit related defectives data in this context would be units that are simply determined to be either good or bad without regard as to why. Accordingly, if the defectives data is process related, then in block 312 the routine 300 determines that process capability should be characterized by calculating a Z short-term value using equation (6), by calculating a Z long-term value using equation (7), and by calculating a DPMO using equation (8).

| | |
|---|---|
| EQN (6) for "Z" short term: | Define: B = defect opportunities per unit<br>If A = 0, then "Z" short term = 0<br>If A $\leq$ 6 then "Z" short term = "Z" long term + 1.5<br>If A > 6, then "Z" short term = NORMSINV(1 − (1/((A × B) + 2))) |
| EQN (7) for "Z" long term: | Define: D = actual number of defects<br>If C = 0, then "Z" long term = 0<br>If D = 0, then "Z" long term = NORMSINV(1 − (1/((C×B) + 2)))<br>If D does not = 0, then "Z" long term = NORMSINV(1 − (D/(C × B))) |
| EQN (8) for DPMO: | If C = 0, then DPMO = 0<br>If D = 0, then DPMO = (1/((C × B) + 2)) ×10$^6$<br>If D does not = 0, then DPMO = (D/(C × B)) × 10$^6$ |

If the defectives data is unit related, then in block 314 the routine 300 determines that process capability should be characterized by calculating a Z short-term value using equation (9), by calculating a Z long-term value using equation (10), and by calculating a DPMO using equation (11).

| | |
|---|---|
| EQN (9) for "Z" short term: | If A = 0, then "Z" short term = 0<br>If A $\leq$ 6 then "Z" short term "Z" long term + 1.5<br>If A > 6, then "Z" short term = NORMSINV(1 − (1/(A + 2))) |
| EQN (10) for "Z" long term: | Define: E = number of defective units<br>If C = 0, then "Z" long term = 0<br>If E = C, then "Z" long term = −6<br>If E = 0, then "Z" long term = NORMSINV(1 − (1/(C + 2)))<br>If E does not = 0, then "Z" long term = NORMSINV((1 − E)/C) |
| EQN (11) for DPMO: | If C = 0, then DPMO = 0<br>If E = 0, then DPMO = (1/(C + 2)) × 10$^6$<br>If E does not = 0, then DPMO = (E/C) × 10$^6$ |

Figure 4:
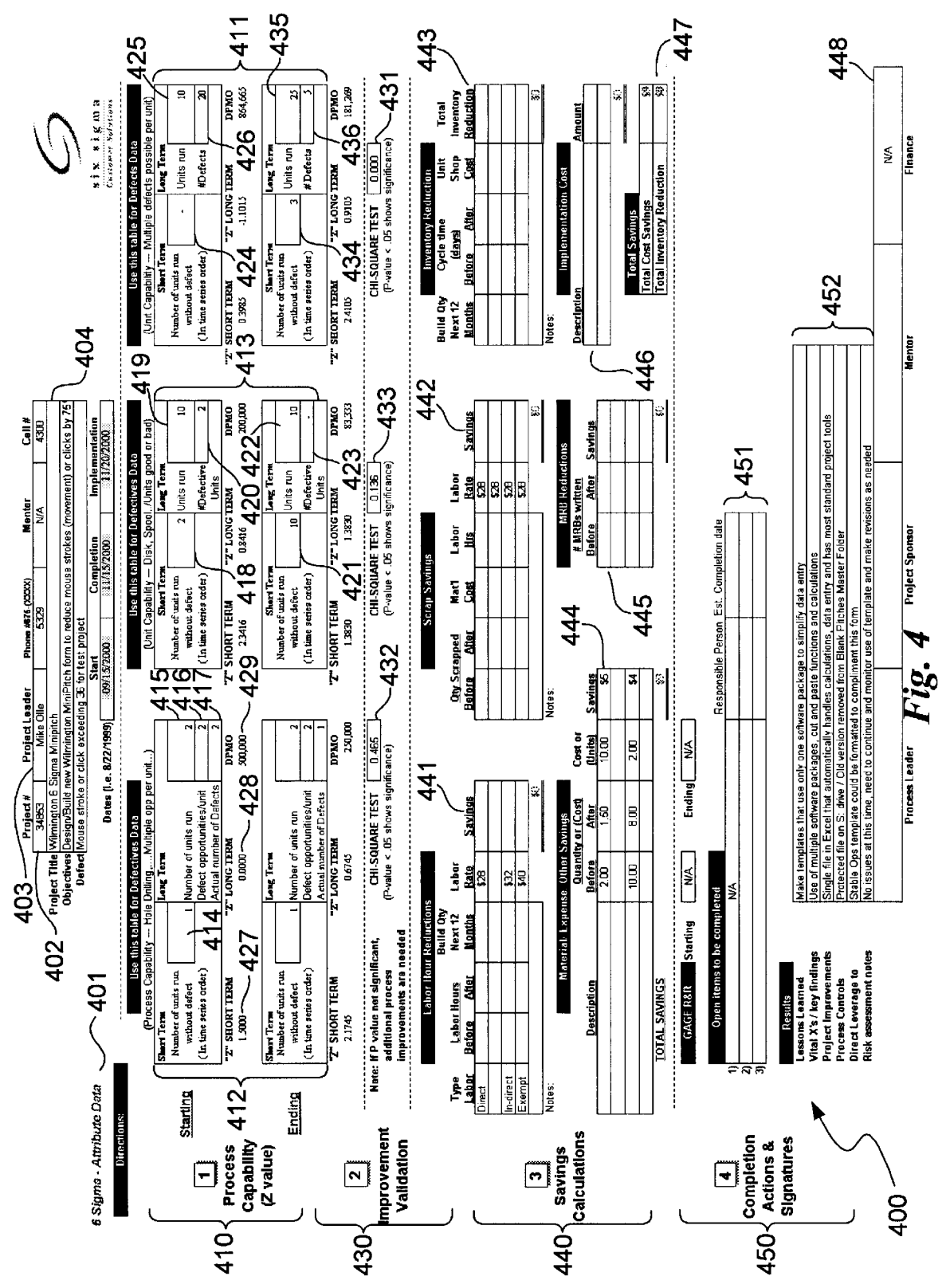

FIG. 4 is a diagram illustrating a display description 400 for generating a quality enhancement project report in accordance with an embodiment. The display description 400 in this embodiment is an attribute data form that is displayed on a computer display screen. A user enters selected process data in appropriate fields on the attribute data form 400, and the attribute data form automatically generates the report by calculating and displaying selected output based on the data entered by the user. In one embodiment, the attribute data form 400 can generate a report of a Six Sigma quality enhancement project. In other embodiments, the attribute data form 400 can generate a report of other quality enhancement projects where process performance data is collected both before and after process improvements have been made. The attribute data form 400 displays starting process capability data corresponding to the process before any improvements have been made, ending process capability data corresponding to the process after improvements have been made, and a P value corresponding to the confidence level associated with the starting and ending process capability data. With this information, a person reviewing a report comprising the attribute data form 400 could quickly determine whether or not the process has actually been improved, and if so, the level of confidence supporting the conclusion.

The attribute data form 400 can be implemented using known spreadsheet software applications. For example, in one embodiment the attribute data form 400 can be implemented using Microsoft Excel spreadsheet software. In other embodiments, other software applications having standard spreadsheet functionality can be used to implement the attribute data form 400 in accordance with the present disclosure. In general, all of the formulas used to determine the calculated values shown on the attribute data form 400 are known in the field of statistics. Throughout the attribute data form 400, shaded fields indicate those fields that receive selected input from the user. Where data entered by the user is used in multiple calculations, the data fields of the attribute data form 400 are linked appropriately to eliminate the need to enter the same data twice.

Returning momentarily to the routine 300 of FIG. 3, recall that the user selects the attribute data form 400 when the process which is the focus of the quality enhancement project involves attribute data rather than continuous data. Accordingly, the attribute data form 400 includes an identification field 401 that identifies the form as an attribute data form. A project header portion 402 near the top of the attribute data form 400 includes a project title field 404 and a project leader field 403 that receive the indicated information from the user. Other basic project information, such as project objectives, process defects and the start, completion and implementation dates, is also entered in the project header portion 402.

The attribute data form 400 includes a process capability portion 410 for displaying starting and ending process capability data. The process capability portion 410 includes a defects portion 411, a process capability defectives portion 412 and a unit capability defectives portion 413. Recall from FIG. 3 and the related discussion that after determining the process involves attribute data, the user determines if the attribute data is defects attribute data or defectives attribute data. If the process involves defects attribute data, then the user enters process data in the defects portion 411. If instead the process involves defectives attribute data, then the user further determines if the data is based on process capability or unit capability. If the process involves defectives data based on process capability, then the user enters process data in the process capability defectives portion 412. If instead the process involves defectives data based on unit capability, then the user enters process data in the unit capability defectives portion 413.

The process capability defectives portion 412 includes a starting section and an ending section. The starting section has a short-term data field 414, and three long-term data fields 415, 416 and 417. The user enters "a number of units ran without a defect" in field 414. This data should be in time series order. That is, the data input into field 414 should be the largest number of units consecutively produced without a defect in a given production run. In field 415, the user enters the total number of units produced in the production run. In field 416, the user enters the number of defect opportunities per unit. In field 417, the user enters the total number of actual defects produced in the production run. After the fields 414 through 417 have been populated by the user, the attribute data form 400 automatically generates a corresponding Z short term value, a Z long term value and DPMO value in output fields 427, 428 and 429. Equations for calculating Z short term, Z long term and DPMO with the defectives data entered by the user are known in the art. For example, in one embodiment, the equations (6)–(8) shown above can be used. In other embodiments, other known statistics equations can be used to calculate these values.

The user enters process data in the ending section of the process capability defectives portion 412 after improvements to the process have been made. The various data fields in the ending section receive the same types of process data as their counterparts in the starting section, as explained above. Accordingly, after the ending process data is entered, the attribute data form 400 automatically generates a Z short term, a Z long term and a DPMO that correspond to the ending process capability.

The unit capability defectives portion 413 includes a starting section and an ending section. The starting section includes a short-term data field 418 and a long-term data field 419 which receive the same data as data fields 414 and 415 of the process capability defectives portion 412. The starting section also includes a long-term data field 420 for entering a total number of defective units. Based on the data entered in fields 418 through 420, the attribute data form 400 automatically generates a Z short term value, a Z long term value and a DPMO value corresponding to the starting process capability. Similarly, a Z short term value, a Z long term value and a DPMO value corresponding to the ending process capability are automatically generated by the attribute data form 400 after data corresponding to the improved process is entered in fields 421, 422 and 423 in the ending section of the unit capability defectives portion 413. Equations for calculating Z short term, Z long term and DPMO with the defectives data entered by the user are known in the art. For example, in one embodiment, the equations (9)–(11) as shown above can be used. In other embodiments, other known statistics equations can be used to calculate these values.

The defects portion 411 includes a starting section and an ending section. The starting section includes a short-term data field 424 and two long-term data fields 425 and 426. The data fields 424 and 425 receive the same data as data fields 418 and 419 of the unit capability defectives portion 413. The defects portion 411 also includes a long-term data field 426 for entering a total number of defects. As with the defectives portions 412 and 413, a Z short term value, a Z long term value and a DPMO value corresponding to the starting process capability are automatically generated by the attribute data form 400 once the respective process data has been entered in the fields 424–426. Similarly, a Z short term value, a Z long term value and a DPMO value corresponding to the ending process capability are automatically generated by the attribute data form 400 after data corresponding to the improved process is entered in fields 434, 435 and 436 in the ending section of the defects portion 411. Equations for calculating a Z short term, Z long term and DPMO with the defects data entered by the user are known in the art. For example, in one embodiment, the equations (3)–(5) as shown above can be used. In other embodiments, other known statistics equations can be used to calculate these values.

A comparison of the starting and ending Z and DPMO values provides an indication of the effectiveness of the process improvements. Recall that the Z value corresponds to the number of standard deviations between the process mean and the nearest specification limit. Therefore, if a process improvement increases the process capability from a Z value of 1 to a Z value of 3, for example, then this would signify a substantial increase in process capability and would suggest that this process improvement should become a standard part of the process. However, as will be recognized by those of ordinary skill in the art of statistics, it is often necessary to establish a confidence level for the process capability data before drawing a conclusion from the data.

The attribute data form 400 includes an improvement validation portion 430 for displaying a P value. The P value is automatically generated using data entered in the process capability portion 410. In one embodiment, the P value is calculated using the chi-square test and is shown in field 432 for process capability defectives data, field 433 for unit capability defectives data and field 431 for defects data. As is well known, other methods are available for statistically calculating a P value. For example, the 2-sample-t and the variance test are two other methods that can be used in accordance with the present disclosure. In the illustrated embodiment, a P value of less than 0.05 in fields 431–433 indicates significant confidence in the data presented in the corresponding process capability portion 410.

Total cost savings and total inventory reductions expected to result from incorporating a process improvement are calculated in a savings portion 440 of the attribute data form 400. The savings portion 440 includes a labor hour reductions section 441, a scrap savings section 442, an inventory reduction section 443, a miscellaneous savings section 444, an MRB reductions section 445 and an implementation cost section 446. The labor hour reductions section 441 receives data corresponding to various types of labor, such as direct, indirect and exempt, and calculates the total savings resulting from labor hour reductions accordingly. The labor hour reductions section 441 has before and after fields for entering per-unit labor hours required both before and after the process improvement. The per-unit reduction in labor hours multiplied by the build quantity over the next twelve months multiplied by the applicable labor rate gives the savings over the next 12 months as is shown in a savings field and totaled accordingly.

The scrap savings section 442 includes before and after fields for entering scrappage data for the process both before and after the process improvement. Fields are also provided for entering the material cost and the labor hours expended on scrapped material. Multiplying the reduction in quantity scrapped by the material cost, and adding this to the labor hours saved multiplied by the labor rate, results in the scrap savings as is shown in a savings field and totaled accordingly.

The inventory reduction section 443 has a field for entering an expected build quantity over the next twelve months and fields for entering both before and after build cycle times. A field is also included for entering a shop cost for each unit. The reduction in inventory shelf time resulting from the reduced cycle time can be multiplied by the unit shop cost, which in turn can be multiplied by an appropriate interest rate to determine the cost reduction associated with the time value of money. This value is shown in a total inventory reduction field and totaled accordingly.

The miscellaneous savings section 444 includes description, before and after, and cost fields for entering appropriate cost data related to other expenses. The resulting savings are automatically calculated in a savings field and totaled accordingly. As is known in the art, MRB is an acronym that stands for Material Review Board, and refers to quality control documents written against defective process outputs. The MRB reductions section 445 includes before and after fields for entering the number of MRB's written both before and after the process improvement. The resulting savings are automatically calculated by the attribute data form 400 then shown in a savings field and totaled accordingly. The implementation cost section 446 includes fields for entering descriptions of various implementation costs and corresponding amounts.

The total cost savings and total inventory reduction savings are displayed in a total savings section 447. This output is automatically calculated by the attribute data form 400 using the economic data entered in sections 441 through 446. In one embodiment, if the total cost savings does not exceed a cost savings endorsement limit of $50,000, then the attribute data form 400 indicates that a finance signature is not required in a finance block 448. Similarly, if the total inventory reduction savings is less than the inventory reduction savings endorsement limit of $100,000, then the finance signature is also not required in the finance block 448. In other embodiments, other denominations can be established as the cut-off for when a finance signature is required to validate the potential savings.

A completion portion 450 includes an open items section 451 and a results section 452. The open items section 451 includes a description field for the user to enter an open item description, a responsible person field for indicating the responsible party and an estimated completion date field. The results section 452 includes a number of fields for inputting various results data such as lessons learned, vital X's, key findings, project improvements and other various types of results data. A signature section 453 includes appropriate fields wherein the indicated parties can sign a hard copy of the generated report to signify their concurrence with the advertised results. Accordingly, after receiving the basic project information described above, the attribute data form 400 can automatically generate a report of the quality enhancement project that can be used to make a determination of whether or not the process improvement should be implemented.

Figure 5:
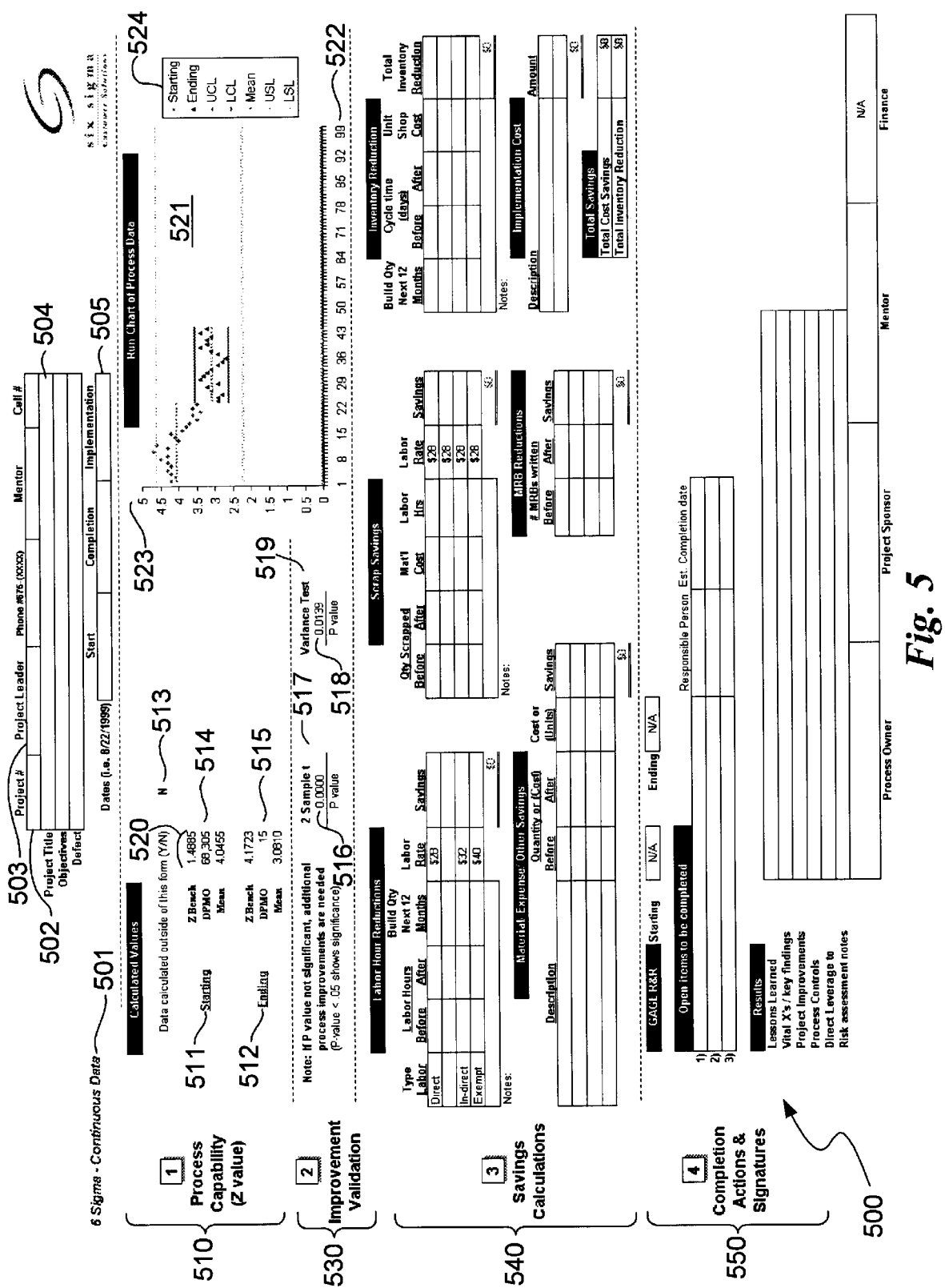
FIG. 5 is a diagram illustrating a display description for generating a quality enhancement project report in accordance with another embodiment.

FIG. 5 is a diagram illustrating a display description 500 for generating a quality enhancement project report in accordance with another embodiment. The display description 500 in this embodiment is a continuous data form that is displayed on a computer display screen. A user enters selected process data in appropriate fields on the continuous data form 500, and the continuous data form automatically generates the report by calculating and displaying selected output based on the data entered by the user. In one embodiment, the continuous data form 500 can generate a report of a Six Sigma quality enhancement project. In other embodiments, the continuous data form 500 can generate a report of other quality enhancement projects where process performance data is collected both before and after process improvements have been made. In one embodiment, the continuous data form 500 can be created using a suitable spreadsheet software application such as Microsoft Excel. In other embodiments, other suitable spreadsheet software applications can be used. In general, all of the formulas used to determine the calculated values shown on the continuous data form 500 are known in the field of statistics. Where data entered by the user in various fields on the continuous data form 500 are used in multiple calculations, the data fields of the continuous data form 500 are linked appropriately to eliminate the need to enter the same data twice.

The continuous data form 500 has an identification field 501 that identifies the form as a continuous data form. A project header portion 502 includes a project leader field 503 and a project title field 504, in addition to other fields which the user can fill in to identify the corresponding quality enhancement project. As on the attribute data form 400, shaded data fields on the continuous data form 500 indicate fields that receive selected data from the user. A timeline 505 includes fields for entering a project start date, a project completion date and an implementation date for the process improvement that results from the project.

Like the attribute data form 400 of FIG. 4, the continuous data form 500 includes a process capability portion 510, an improvement validation portion 530, a savings portion 540 and a completion portion 550. The process capability portion 510 includes a starting process capability section 511 that shows a Z bench value, a DPMO value and a mean value corresponding to the process before any improvements have been made. An ending process capability section 512 shows a Z bench value, a DPMO value and a mean value corresponding to the process after improvements have been made. These starting and ending process capability values can be displayed using the continuous data form 500 in two different ways. For example, if the user types an "N" in an option field 513, this indicates that these process capability values will not be generated by the continuous data form 500, but instead will be calculated outside of the continuous data form. In this case, the user simply enters the starting and ending process capability values provided by the outside source in fields 514 and 515. In one embodiment, these outside source values can be determined by the user using hand calculations. Conversely, if the user enters a "Y" in the option field 513, then the continuous data form 500 will automatically generate the starting and ending process capability values which are shown in column 520. In this embodiment, the starting and ending process capability values of Z bench, DPMO and the mean shown in column 520 are calculated from selected data entered on a suitable spreadsheet that is accessed by the continuous data form 500.

As is known by those of ordinary skill in the relevant art, Z "bench" is similar to the Z value explained above, except that Z bench is a metric describing the total Sigma level of a continuous data distribution. Z bench can be calculated by determining the total probability of a defect for a continuous data distribution by adding the probability of a defect at the lower spec limit tail of the data distribution to the probability of a defect at the upper spec limit tail. After the total probability of a defect has been calculated, it can be divided by the standard deviation to determine Z bench. Equations for calculating a Z bench and DPMO value as shown in column 520 using spreadsheet data are known in the art. For example, in one embodiment, equations (1) and (2) as shown above can be used. In other embodiments, other known statistics equations can be used to calculate these values. After the continuous data form 500 has generated starting and ending process capability values for Z bench, DPMO and the mean, review of these numbers allows a determination of whether the improvements made to the process in accordance with the Six Sigma project did in fact significantly enhance the quality of the product.

The improvement validation portion 530 includes two P value fields 516 and 518. As is known by those of ordinary skill in the relevant art, the P value is referred to as an "observed significance level" or probability, and provides a method for determining a confidence level associated with statistical data. The P value shown in field 516 is calculated from selected spreadsheet data using the 2-sample-t method. The P value shown in field 518 is also calculated from selected spreadsheet data, however, it is calculated using the variance test method. In one embodiment, if the P value shown is less than or equal to 0.05, then the starting and ending process capability values shown will have at least a 95% confidence level associated with them. As noted on the continuous data form 500, the corresponding process improvements are accordingly deemed sufficient and additional process improvements are not needed. If the user has entered an "N" in the option field 513, then this indicates that the P value will not be automatically generated by the continuous data form 500, but instead will come from an outside source. In this case, the user enters such P values in fields 517 and 519.

The continuous data form 500 also includes a process performance chart 521 to graphically illustrate the results of a process improvement in accordance with an embodiment. The process performance chart 521 provides a graphical illustration of the process improvements that compliments the data provided in the starting and ending process capability fields. The process performance chart 521 is generated using selected process data recorded in a suitable spreadsheet format. A horizontal axis 522 of the performance chart 521 shows data point numbers, and a vertical axis 523 shows corresponding data values. A legend 524 identifies the symbols used on the performance chart 521. Data points corresponding to the unimproved process are represented by red triangles, and data points corresponding to the improved process are represented by the blue triangles.

For the purpose of illustration, assume that the process of interest is a hole drilling process where the upper specification limit (USL) on the hole diameter is 4.6 (shown by the upper dotted line), and the lower specification limit (LSL) on the hole diameter is 2.2 (shown by the lower dotted line). Accordingly, the nominal, or target, hole diameter for the hole drilling process is 3.4. As can be seen by reference to the performance chart 521, the unimproved hole drilling process yields a mean hole diameter of approximately 4.0, and at least one of the holes exceeds the allowable upper spec limit. In contrast, the improved hole drilling process yields a mean hole diameter of approximately 3.1, much closer to the target hole diameter of 3.4. Thus, the performance chart 521 provides graphical data for determining the efficacy of process improvements at a glance.

In one embodiment, the savings portion 540 and the completion portion 550 of the continuous data form 500 are substantially similar to their counterparts on the attribute data form 400 discussed above. Therefore, these portions do not require further discussion here.

FIG. 6 is a diagram illustrating a spreadsheet 600 for compiling selected process data that can be used by the continuous data form 500 to calculate numerical and graphical starting and ending process capability data in accordance with an embodiment. In one embodiment, the spreadsheet 600 can be created using a software application such as the Microsoft Excel spreadsheet program. In other embodiments, other suitable spreadsheet software applications can be used. The spreadsheet 600 has a data entry portion 602 that includes a starting process data portion 604 and an ending process data portion 606. The shaded fields on FIG. 6 receive data entries from the user. The data entry portion 602 includes an USL field and a LSL field. In the hole drilling process example explained above, these would correspond to the upper hole diameter limit of 4.6 and the lower hole diameter limit of 2.2, respectively. As noted on the spreadsheet 600, no lower specification limit is needed for cycle time data.

The starting process data portion 604 receives data from the user corresponding to the unimproved process, and the ending process data portion 606 receives data corresponding to the improved process. For example, if 22 holes were drilled by the unimproved process, then their resulting diameters would be listed in the starting process data portion 604. Similarly, if 21 holes were drilled after the process had been improved, then their resulting diameters would be listed in the ending process data portion 606. As will be understood by those of ordinary skill in the art, the starting and ending process capability parameters of Z bench, DPMO and the mean, as shown on the continuous data form 500 of FIG. 5, can be calculated with the starting and ending data shown in FIG. 6, using known methods. For example, in one embodiment, equations (1) and (2) as shown above can be used to calculate a Z bench value and a DPMO value using the data structures shown in FIG. 6. In other embodiments, other known statistical equations can be used.

Figure 7:
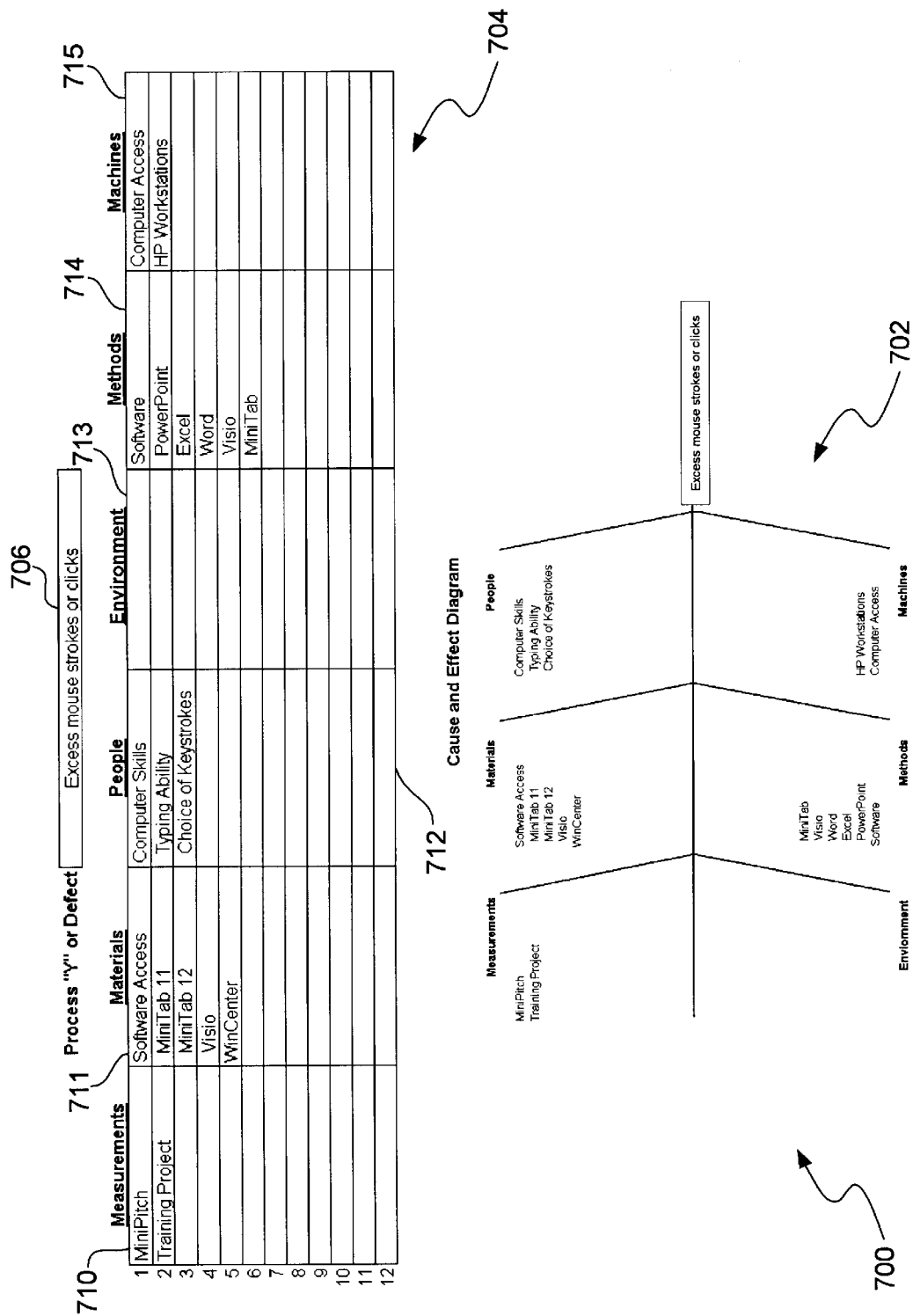
FIG. 7 is a diagram illustrating a display description for a quality enhancement tool in accordance with an embodiment.

As explained above, the data forms illustrated in FIGS. 4 and 5 are used to automatically generate a report of a quality enhancement project after the project has been completed and process improvements have been identified. FIG. 7 is a diagram illustrating a display description 700 of a quality enhancement tool in one embodiment. The quality enhancement tool can be used during the quality enhancement project to identify problems with the process in order to establish process improvements. In one embodiment, the display description 700 provides a graphical representation of a cause-and-effect diagram 702 having a data input portion 704. In a defect field 706, the user enters the name of a process problem. Potential causes of the problem are listed in columns 710 through 715. These causes can be broken down into their respective groups, such as measurements, materials, people, environment, methods and machines. As the quality enhancement project participants brainstorm different potential causes, the user enters these potential causes accordingly in the appropriate column. The data input fields 704 are linked to the cause-and-effect diagram 702, such that the display description 700 automatically populates the cause-and-effect diagram with the appropriate problem causes, as listed in the counterpart data fields. Reference to the cause-and-effect diagram can facilitate the recognition of root causes of the identified problem.

FIG. 8 is a diagram illustrating a risk assessment display description 800 for identifying quality enhancement project risks in accordance with an embodiment. The risk assessment display description 800 includes a risk category portion 802 and a risk identification portion 804. The user enters the different risk categories in appropriate shaded fields under the category portion 802. The risks corresponding to those categories are similarly entered in the adjacent fields under the risk portion 804. The probability of each risk coming to fruition is entered as an L, M, or H, corresponding to low, medium, or high, in a probability column 806. An impact portion 808 similarly allows the user to identify the schedule, cost, and technical impact associated with each of the identified risks. Similarly, the schedule, cost, and technical aspects associated with each risk are given a numerical rating in a weighting portion 810. In one embodiment, weightings from 1 to 3 are used. In other embodiments, other weightings may be selected as the circumstances merit. A score column 812 provides the cumulative score corresponding to each of the identified risks, with the highest score corresponding to the highest risk. The weighting fields and total score fields are not populated by the user. These fields are automatically generated on the display description 800 after the user enters the impact ratings in the appropriate fields. Potential abatement plans corresponding to each risk are entered by the user in an abatement plan portion 814. Use of the risk assessment display description 800 by the participants in a quality enhancement project can facilitate their recognition of potential process improvements in accordance with an embodiment.

Figure 9:
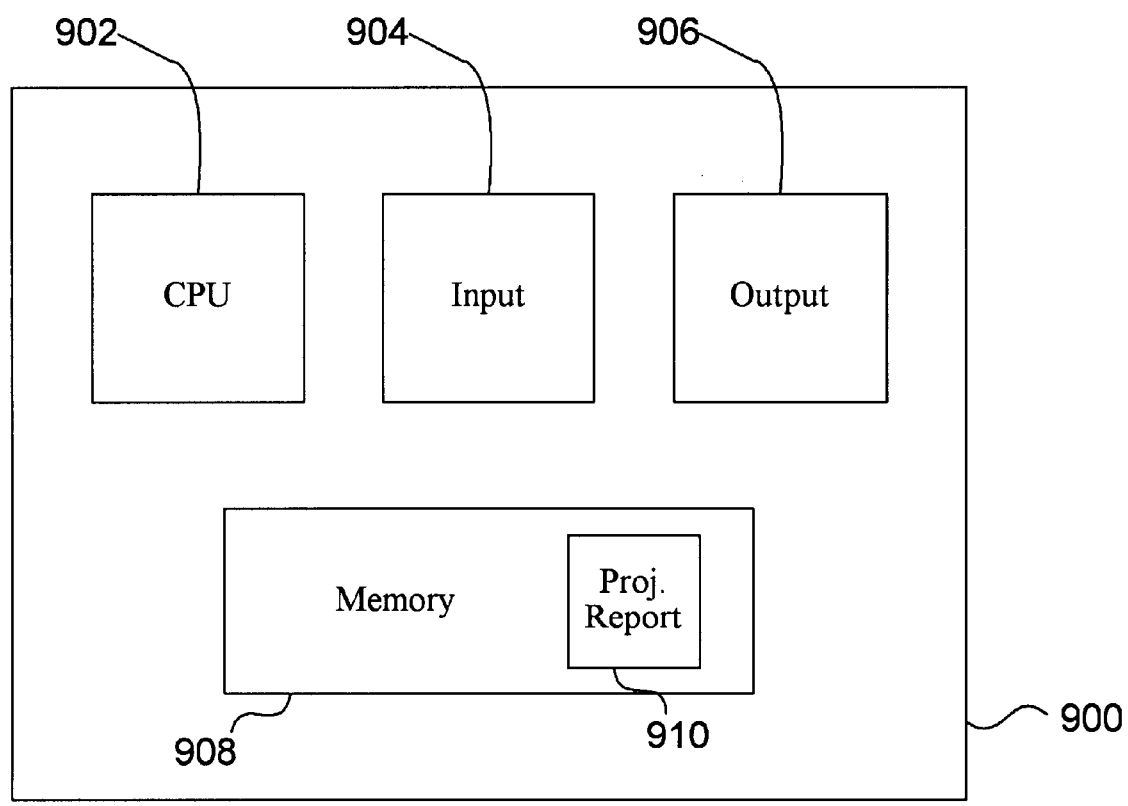
FIG. 9 is a block diagram illustrating a computer system for generating a quality enhancement project report in accordance with an embodiment.

FIG. 9 is a block diagram of a computer system 900 for generating a quality enhancement project report in accordance with the methods described above. In one embodiment, the computer system 900 generates a report of a Six Sigma quality enhancement project. In other embodiments, the computer system 900 can be used to generate reports of other quality enhancement projects where process data is collected both before and after process improvements have been made. The computer system 900 includes a central processing unit 902, a memory 908, an input device 904 and an output device 906. The central processing unit 902 can include circuitry for performing computer functions, such as executing software to perform desired calculations and tasks. The input device 904 can include automatic input devices such as a computer-readable media drive, or manual input devices such as a keypad or mouse, for inputting data into the central processing unit 902. The output device 906 can include devices coupled to the central processing unit 902, such as a printer or a display screen for presenting display descriptions or other data. The computer memory 908 can include storage media containing computer-executable instructions for performing various tasks and presenting various displays on the output device 906. For example, the memory 908 can include a project report component 910 that contains computer-executable instructions for generating a report of quality enhancement project, such as a Six Sigma project, as described above in accordance with the routine 200 and the display descriptions of FIGS. 4 and 5.

Based on the above description, it will be appreciated that although various embodiments of the technology have been described for purposes of illustration, various modifications may be made without deviating from the spirit and scope of the present disclosure. Accordingly, the present invention is not limited except by the appended claims.

We claim:

1. A method in a computer system for generating a report of a quality enhancement project, the quality enhancement project being directed to improving a process to reduce the number of defects or defective units produced by the process, the method comprising:

receiving starting process performance data for the unimproved process;

determining a starting process capability based on the received starting process performance data;

receiving ending process performance data for the improved process;

determining an ending process capability based on the received ending process performance data;

determining a confidence level associated with the starting and ending process capabilities; and generating a report including the starting process capability, the ending process capability, and the confidence level, wherein generating the report comprises generating a display description comprising the starting process capability, the ending process capability, and the confidence level.

2. The method of claim 1 wherein the starting process performance data and the ending process performance data are directed to the same process parameter.

3. The method of claim 1 wherein the starting process performance data is attribute data.

4. The method of claim 1 wherein the starting process performance data is continuous data.

5. The method of claim 1 wherein the starting process performance data is defects attribute data.

6. The method of claim 1 wherein the starting process performance data is defectives attribute data.

7. The method of claim 6 wherein the starting process performance data is defectives attribute data related to process capability.

8. The method of claim 6 wherein the starting process performance data is defectives attribute data related to unit capability.

9. The method of claim 1 wherein determining the starting process capability comprises determining a Z value.

10. The method of claim 1 wherein determining the starting process capability comprises determining a DPMO value.

11. The method of claim 1 wherein determining the confidence level associated with the starting and ending process capabilities comprises determining a P value.

12. The method of claim 11 wherein determining the P value comprises the chi-square method.

13. The method of claim 11 wherein determining the P value comprises the 2-sample-t method.

14. The method of claim 11 wherein determining the P value comprises the variance test method.

15. The method of claim 1 wherein generating the report comprises generating a process performance chart that graphically illustrates the starting process performance data and the ending process performance data.

16. The method of claim 1, further comprising:

receiving economic data corresponding to the improved process; and determining a cost savings associated with implementation of the process improvement.

17. The method of claim 16 wherein generating the report comprises generating a display description comprising the starting process capability, the ending process capability, the confidence level, and the cost savings.

18. A method in a computer system for generating a report of a quality enhancement project, the quality enhancement project being directed to improving a process to reduce the number of defects or defective units produced by the process, the method comprising:

receiving starting process performance data for the unimproved process;

determining a starting process capability based on the received starting process performance data;

receiving ending process performance data for the improved process;

determining an ending process capability based on the received ending process performance data;

determining a confidence level associated with the starting and ending process capabilities; and generating a report including the starting process capability, the ending process capability, and the confidence level, wherein the quality enhancement project is a Six Sigma quality enhancement project.

19. A method for characterizing process capability, the method comprising:

receiving process performance data determining whether the process performance data is attribute data or continuous data;

when it is determined that the process performance data is attribute data, characterizing process capability with a Z short term and/or a Z long-term value; and when it is determined that the process performance data is continuous data, characterizing process capability with a Z bench value calculated using equation (1).

20. The method of claim 19 wherein when it is determined that the process performance data is attribute data, then the method further comprises:

determining if the attribute data is defects data or defectives data; and when it is determined that the attribute data is defects attribute data characterizing process capability by calculating a Z short term value using equation (3) and a by calculating a Z long term value using equation (4).

21. The method of claim 19 wherein when it is determined that the process performance data is attribute data, then the method further comprises:

determining if the attribute data is defects data or defectives data;

when it is determined that the attribute data is defectives attribute data determining if the defectives attribute data is process related or unit related;

when it is determined that the defectives attribute data is process related characterizing process capability by calculating a Z short term value using equation (6) and by calculating a Z long term value using equation (7).

22. The method of claim 19 wherein when it is determined that the process performance data is attribute data, then the method further comprises:

determining if the attribute data is defects data or defectives data;

when it is determined that the attribute data is defectives attribute data determining if the defectives attribute data is process related or unit related;

when it is determined that the defectives attribute data is unit related characterizing process capability by calculating a Z short term value using equation (9) and by calculating a Z long term value using equation (10).

23. A method in a computer system for generating a report of a Six Sigma quality enhancement project, the Six Sigma quality enhancement project being directed to enhancing the quality of a process, the method comprising:

receiving process performance data;

automatically determining a process capability based on the received process performance data; and automatically generating a display description including the process capability for generating a report of Six Sigma quality enhancement project.

24. The method of claim 23 wherein the process performance data is attribute data.

25. The method of claim 23 wherein the process performance data is continuous data.

26. The method of claim 23 wherein the process performance data is defects attribute data.

27. The method of claim 23 wherein the process performance data is defectives attribute data.

28. The method of claim 23 wherein the process performance data is defectives attribute data related to process capability.

29. The method of claim 23 wherein the process performance data is defectives attribute data related to unit capability.

30. The method of claim 23 wherein automatically determining a process capability comprises automatically determining a Z value.

31. The method of claim 23 wherein automatically determining a process capability comprises automatically determining a DPMO value.

32. The method of claim 23, further comprising automatically generating a process performance chart that graphically illustrates the process performance data.

33. The method of claim 23, further comprising:

automatically determining a confidence level associated with the process capability; and wherein automatically generating a display description comprises automatically generating a display description including the process capability and the confidence level.

34. The method of claim 33 wherein automatically determining a confidence level comprises automatically determining a P value.

35. The method of claim 34 wherein automatically determining a P value comprises use of a chi-square method.

36. The method of claim 34 wherein automatically determining a P value comprises use of a 2-sample-t method.

37. The method of claim 34 wherein automatically determining a P value comprises use of a variance test method.

38. A method for generating a report of a Six Sigma quality enhancement project, the Six Sigma quality enhancement project being directed to improving a process to reduce the number of defects or defective units produced by the process, the method comprising:

receiving starting process performance data for the unimproved process;

determining a starting process capability based on the received starting process performance data;

receiving ending process performance data for the improved process;

determining an ending process capability based on the received ending process performance data;

determining a confidence level associated with the starting and ending process capabilities; and generating a report including the starting process capability, the ending process capability, and the confidence level.

39. The method of claim 38 wherein the starting process performance data and the ending process performance data are the same type of data.

40. The method of claim 38 wherein the starting process performance data is either attribute data or continuous data.

41. The method of claim 38 wherein determining the starting process capability comprises determining a Z value and a DPMO value.

42. The method of claim 38 wherein determining the confidence level associated with the starting and ending process capabilities comprises determining a Probability value.

43. The method of claim 38 wherein determining the confidence level associated with the starting and ending process capabilities comprises determining a P value using the chi-square method.

44. The method of claim 38 wherein generating the report comprises generating a display description comprising the starting process capability, the ending process capability, and the confidence level.

45. The method of claim 38, further comprising:

receiving economic data corresponding to the improved process; and determining a cost savings associated with implementation of the process improvement.

46. The method of claim 45 wherein generating the report comprises generating a display description comprising the starting process capability, the ending process capability, the confidence level, and the cost savings.

47. A computer-readable medium containing a display description for comparing a starting process capability to an ending process capability, the starting process capability corresponding to a process before an improvement has been implemented, the ending process capability corresponding to the process after the improvement has been implemented, the display description comprising;

a process capability portion, the process capability portion including a starting process capability section for displaying a starting process capability, and an ending process capability section for displaying an ending process capability; and an improvement validation portion, the improvement validation portion for displaying a confidence level that is associated with the displayed ending process capability, wherein the improvement validation portion includes a P value.

48. The computer-readable medium of claim 47 wherein the display description further comprises:

a header portion for identifying a quality enhancement project, the quality enhancement project being directed to the process; and a savings portion including a total cost savings associated with implementation of the process improvement.

49. The computer-readable medium of claim 47 wherein the starting and ending process capability sections include a Z short-term value, a Z long-term value, and a DPMO value.

50. The computer-readable medium of claim 47 wherein the display description is an attribute data form comprising user input fields for receiving selected input from a user, the user input fields being shaded.

51. The computer-readable medium of claim 50 wherein the display description comprises at least one user input field for receiving starting process performance data from the user and at least one user input field for receiving ending process performance data from the user.

52. The computer-readable medium of claim 51 wherein the starting process performance data includes a number of units ran without a defect, and the ending process performance data includes a number of units ran without a defect.

53. The computer-readable medium of claim 47 wherein the display description is a continuous data form configured to receive selected input from a computer-implemented spreadsheet.

54. The computer-readable medium of claim 53 wherein the selected input comprises:

continuous ending process performance data;

continuous starting process performance data;

an upper process specification limit; and a lower process specification limit.

55. The computer-readable medium of claim 47 where the display description further comprises:

a process performance chart, the process performance chart providing a graphical illustration of the starting process capability and the ending process capability.

56. The computer-readable medium of claim 55 wherein the process performance chart includes an upper specification limit and a lower specification limit.

57. A computer system for generating a report of a quality enhancement project, the quality enhancement project being directed to improving a process to reduce the number of defects or defective units produced by the process, the computer system comprising:

means for receiving starting process performance data for the unimproved process;

means for determining a starting process capability based on the received starting process performance data;

means for receiving ending process performance data for the improved process;

means for determining an ending process capability based on the received ending process performance data;

means for determining a confidence level associated with the starting and ending process capabilities;

means for generating a report including the starting process capability, the ending process capability, and the confidence level;

means for receiving economic data corresponding to the improved process; and means for determining a cost savings associated with implementation of the process improvement.

58. The computer system of claim 57, further comprising:

means for receiving economic data corresponding to the improved process;

means for determining a cost savings associated with implementation of the process improvement; and means for generating a report including the starting process capability, the ending process capability, the confidence level, and the cost savings.

59. A computer-readable medium whose contents cause a computer system to generate a report of a Six Sigma quality enhancement project, the Six Sigma quality enhancement project being directed to improving a process to reduce the number of defects or defective units produced by the process, the report of the quality enhancement project being generated by a method comprising:

receiving starting process performance data for the unimproved process;

determining a starting process capability based on the received starting process performance data;

receiving ending process performance data for the improved process;

determining an ending process capability based on the received ending process performance data;

determining a confidence level associated with the starting and ending process capabilities; and generating a report including the starting process capability, the ending process capability, and the confidence level.

60. The computer-readable medium of claim 59 wherein the method further comprises:

receiving economic data corresponding to the improved process; and determining a cost savings associated with implementation of the process improvement.

61. The method of claim 60 wherein generating the report comprises generating a display description comprising the starting process capability, the ending process capability, the confidence level, and the cost savings.

62. The method of claim 59 wherein determining the starting process capability comprises determining a Z value and a DPMO value.

63. The method of claim 39 wherein determining the confidence level associated with the starting and ending process capabilities comprises determining a P value using the chi-square method.

64. The method of claim 59 wherein generating the report comprises generating a process performance chart that graphically illustrates the starting process performance data and the ending process performance data.

65. A method in a computer system for comparing results from a first quality enhancement project to results from a second quality enhancement project, the first quality enhancement project being directed to improving a first process to reduce the number of defects or defective units produced by the first process, the second quality enhancement project being directed to improving a second process to reduce the number of defects or defective units produced by the second process, the method comprising:

generating a first report of the first quality enhancement project, the first report including a starting process capability for the unimproved first process, an ending process capability for the improved first process, and a confidence level associated with the starting and ending process capabilities for the first process; and generating a second report of the second quality enhancement project, the second report including a starting process capability for the unimproved second process, an ending process capability for the improved second process, and a confidence level associated with the starting and ending process capabilities for the second process, wherein the starting and ending process capabilities and the confidence level for the second process are in the same form as the starting and ending process capabilities and the confidence level, respectively, for the first process, and wherein the confidence levels for the first and second processes comprise P values.

66. The method of claim 65 wherein the starting and ending process capabilities for the first and second processes comprise Z values.

67. The method of claim 65 wherein the starting and ending process capabilities for the first and second processes comprise DPMO values.

68. The method of claim 65 wherein the first and second quality enhancement projects are Six Sigma quality enhancement projects.

69. The method of claim 65 wherein:

generating a first report of the first quality enhancement project comprises generating a first report that includes cost savings related to the improved first process; and generating a second report of the second quality enhancement project comprises generating a second report that includes cost savings related to the improved second process, the cost savings related to the improved second process being in the same form as the cost savings related to the improved first process.

* * * * *